(12) United States Patent
Miller, II et al.

(10) Patent No.: US 6,400,852 B1
(45) Date of Patent: Jun. 4, 2002

(54) ARBITRARY ZOOM "ON -THE -FLY"

(75) Inventors: Edward J. Miller, II, San Jose; Mark P. Rygh, Fremont, both of CA (US)

(73) Assignee: Luxsonor Semiconductors, Inc., Fremont, CA (US)

( * ) Notice: Subject to any disclaimer, the term of this patent is extended or adjusted under 35 U.S.C. 154(b) by 0 days.

(21) Appl. No.: 09/219,815

(22) Filed: Dec. 23, 1998

(51) Int. Cl.⁷ .................................................. G06K 9/32
(52) U.S. Cl. ........................ 382/298; 345/660; 345/661; 348/561; 348/581; 382/293
(58) Field of Search ................................ 382/298, 299, 382/305, 293, 295; 348/581, 596, 561; 345/606, 661

(56) References Cited

U.S. PATENT DOCUMENTS

| | | | |
|---|---|---|---|
| 5,341,466 A | * 8/1994 | Perlin et al. | 395/139 |
| 5,402,513 A | * 3/1995 | Schafer | 382/47 |
| 5,542,003 A | * 7/1996 | Wofford | 382/132 |
| 5,721,565 A | * 2/1998 | Nguyen | 345/127 |
| 5,819,004 A | * 10/1998 | Azadegan et al. | 386/112 |
| 5,969,706 A | * 10/1999 | Tanimoto et al. | 345/130 |
| 6,075,906 A | * 6/2000 | Fenwick et al. | 382/298 |

* cited by examiner

*Primary Examiner*—Bhavesh Mehta
*Assistant Examiner*—Yosef Kassa
(74) *Attorney, Agent, or Firm*—Burns, Doane, Swecker & Mathis

(57) ABSTRACT

A system and method of performing "on-the-fly" zooming (i.e., while the video display is in-motion) having infinite value scaling is provided to give the user the ability to zoom-up by any amount while viewing. The variable "on-the-fly" zooming function is performed by a user employing a user interface device, such as a mouse, to select a window of random size in a display screen which is playing an in-motion video display. The information obtained by the user interface device is converted into scaling information and base address information and are stored into temporary registers. On the next video synchronization signal, the scaling and base address information are loaded into registers used to perform scaling on the pixel data retrieved from the frame buffer area in the video system. The new base address ensures that the pixel data is retrieved so that only the data within the window is scaled. The retrieved video data is then scaled using the new scaling information.

24 Claims, 6 Drawing Sheets

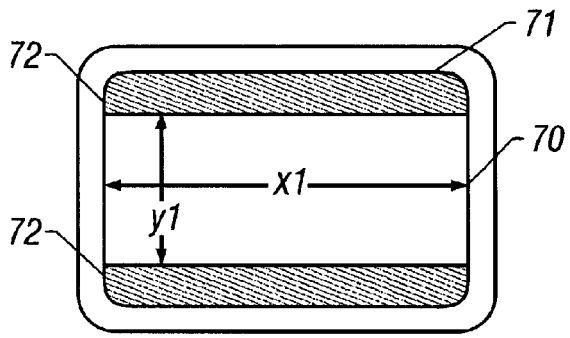
FIG. 6
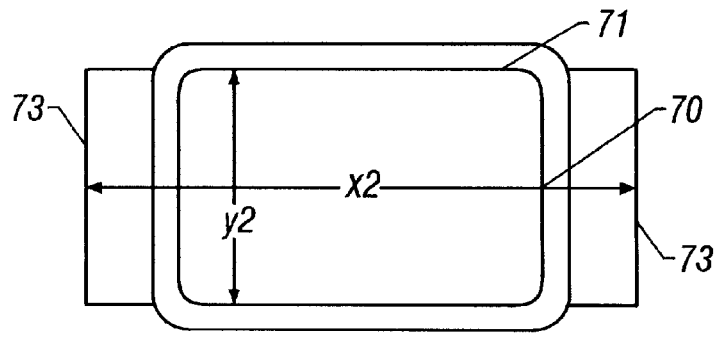
FIG. 7A
FIG. 7B

ARBITRARY ZOOM "ON-THE-FLY"

BACKGROUND OF THE INVENTION

1. Field of the Invention

The present invention relates to video display systems, and in particular to "scaling" and "zooming" in DVD video display systems.

2. State of the Art

Display systems require a source of audio and video (A/V) data in order to display an in-motion picture on a screen. Often times, the source reads the A/V data from a storage median such as a digital versatile data (DVD) disc. The video data stored on the storage median is compressed into a particular compression format such as the MPEG video compression format. The A/V source reads the compressed data and provides it to a decoder which is adapted to interpret the particular compression format of the source and decompresses the data, picture by picture. Each picture of data is referred to as a frame of data. A frame of data is made up of a block of pixels and the number of pixels in each frame is dependent on the original picture format provided by the source of A/V data. For instance, a frame in one format, referred to as PAL, includes 720×576 pixels per frame, whereas a NTSC frame includes 720×480 pixels per frame. The decompressed frames are stored in a memory area referred to as a frame buffer.

The decompressed data is retrieved from the frame buffer by a video processor which retrieves the data at a rate compatible with the rate at which data is to be displayed by the screen. Commonly, the picture format of the A/V data provided by the source is different than the picture format of the display screen such that the number of pixels and the aspect ratio (i.e., the ratio of the number of pixels in each of the horizontal and vertical dimensions of a frame) of the source data is different from that of the display. Hence, one function that is often performed by the video processor is a scaling function which changes the number of pixels per frame and the aspect ratio of the source data to accommodate the number of pixels per frame and aspect ratio of the display screen. Commonly, this scaling function is automatically performed by the video system without intervention by the user.

However, in some cases, although a difference in picture format is present between the source and the display, reformatting is not performed. For instance, movies seen in a movie theater have a picture format in which the frame size is wider in the horizontal dimension of the frame and shorter in the vertical dimension of the frame when compared to a T.V. screen. Commonly, when recording the movie onto, for instance a DVD disc, the A/V data is still in the movie format. As a result, when the DVD disc is subsequently used to show the movie on a T.V. the viewer sees a black box above and below the picture. This is referred to as the letterbox version of the movie. The black boxes are seen since the number of pixels in each frame of the letterbox format data in the vertical dimension is not enough to fill the screen of the T.V.

In some cases, the letterbox is pre-scaled to a T.V. compatible format prior to recording it onto the DVD disc (sometimes referred to as the "panned and scanned" version). In this case, the number of pixels in the letterbox version are increased so that the vertical dimension of the letterbox format matches that of the T.V. As a result, the number of pixels in the horizontal direction are greater than that of the T.V. and hence are "cut-off" to fit within the T.V. screen. In addition, other information, referred to as the directors cut information, is used to determine where the central viewing location of each of the "panned and scanned" picture frame is to be. For instance, the "panned and scanned" T.V. version might focus a little to the left or right of the center of the picture frame of the letterbox version, such that less pixels are "cut-off" on one side of the letterbox version in the horizontal direction than the other side.

Related to the scaling function is the zoom function which is also performed by the video processor. The zoom function is used to increase or decrease the size of the display seen on the screen. In general, it is an option provided to the system user to make the picture on the display screen bigger or smaller. The zoom function is performed by scaling the pixels so as to either increase or decrease the number of pixels per frame of data. Currently, the zoom function is implemented such that when video data is not being displayed or is in a stationary state (e.g., paused), the user can specify to zoom up by two or three times (i.e., 2× or 3×). Alternatively, they may want to zoom down by two or three times. Currently, the function of zooming has been limited to fixed zoom values (2× or 3×). Moreover, to date, the zoom function has only been performed while the display is in a stationary state, (i.e., not in-motion). Once the zoom selection has been made in the stationary state, the display can be put into motion.

The present invention is an improved system and method of performing the zoom function in a display system.

SUMMARY OF THE INVENTION

The present invention is a system and method of performing zoom functions on an "on-the-fly" basis (i.e., while the video display is in-motion). In addition, infinite value scaling is provided to give the user the ability to zoom-up by any amount.

In one embodiment, infinite value zooming is implemented by a user employing a user interface device, such as a mouse, to select a window of random size in a display screen which is playing an in-motion video display. Once selected, the pixel data within that window is automatically scaled to fit in the total size of the display screen using infinite value scaling in accordance with the present invention. In another embodiment, the user can directly specify the zoom factor amount of the selected window using the user interface.

Zooming "on-the-fly" is performed by using input information provided by the user through the user interface to determine scale factor information and base addresses information while the display is in-motion. In one embodiment, scale factor information includes horizontal and vertical scale factors. The scale factor information determines the number of additional pixels to be added in both the vertical and horizontal directions. The base address information determines a starting point within the frame buffer data at which data is retrieved from the video system memory. This starting point, in one embodiment, corresponds to the location of the user selected window within the display. Scaling is performed "on-the-fly" by obtaining new scale factor information and base address information and updating scale factor and base address registers while the display is in a video blanking period. Subsequent the video blanking period, video data is retrieved from the frame buffer area at the location indicated by the base address and the retrieved data is scaled using the new scale factors.

In accordance with one embodiment, system software which resides within a system processor in the video system obtains the information from the user interface to calculate how much to scale the selected window of pixels. In this embodiment, new scale factor information and base address information are temporarily stored and then loaded into scale factor and base address registers during the video blanking period by the system processor. The new scale factor register values are then used when performing the scaling for the next frame of pixel data that is retrieved after the video blanking period. Scaling is performed using interpolation hardware which performs fixed point computations thereby allowing infinite value scaling.

In another embodiment, in which the video data source such as the DVD or CD disc provides the movie format (i.e. letterbox format) data to a T.V. or computer monitor, "director's cut" information relating to horizontal positioning which is encoded within the letterbox format data is extracted and used to determine the best central viewing location of a given frame of displayed pixel data when the data is being zoomed up and is used to determine the amount of data "cut-off" from the sides of the display.

Alternatively, users can disable the directors cut information and pan and scan (i.e., move the central viewing location left, right, up or down) within the in-motion picture. Hence, in accordance with this embodiment, the central viewing location can be changed "on-the-fly". This is achieved only by changing the base address information during the video blanking period without changing scale factors. In this way, users can create their own "panned and scanned" version of letterbox formatted video source data.

BRIEF DESCRIPTION OF THE DRAWINGS

The present invention may be further understood from the following written description on conjunction with the appended drawings. In the drawings:

FIG. 6 shows a logical block diagram of one embodiment of a vertical interpolation unit for performing scaling in an "on-the-fly" zooming system in accordance with the present invention;

FIG. 7A shows an example of a frame of letterbox formatted pixels displayed on a differently formatted display screen;

FIG. 7B shows an example of a "panned and scanned" version of a frame of letterbox formatted pixel data displayed on the display screen shown in FIG. 7A;

DETAILED DESCRIPTION OF THE PREFERRED EMBODIMENTS

Figure 1:
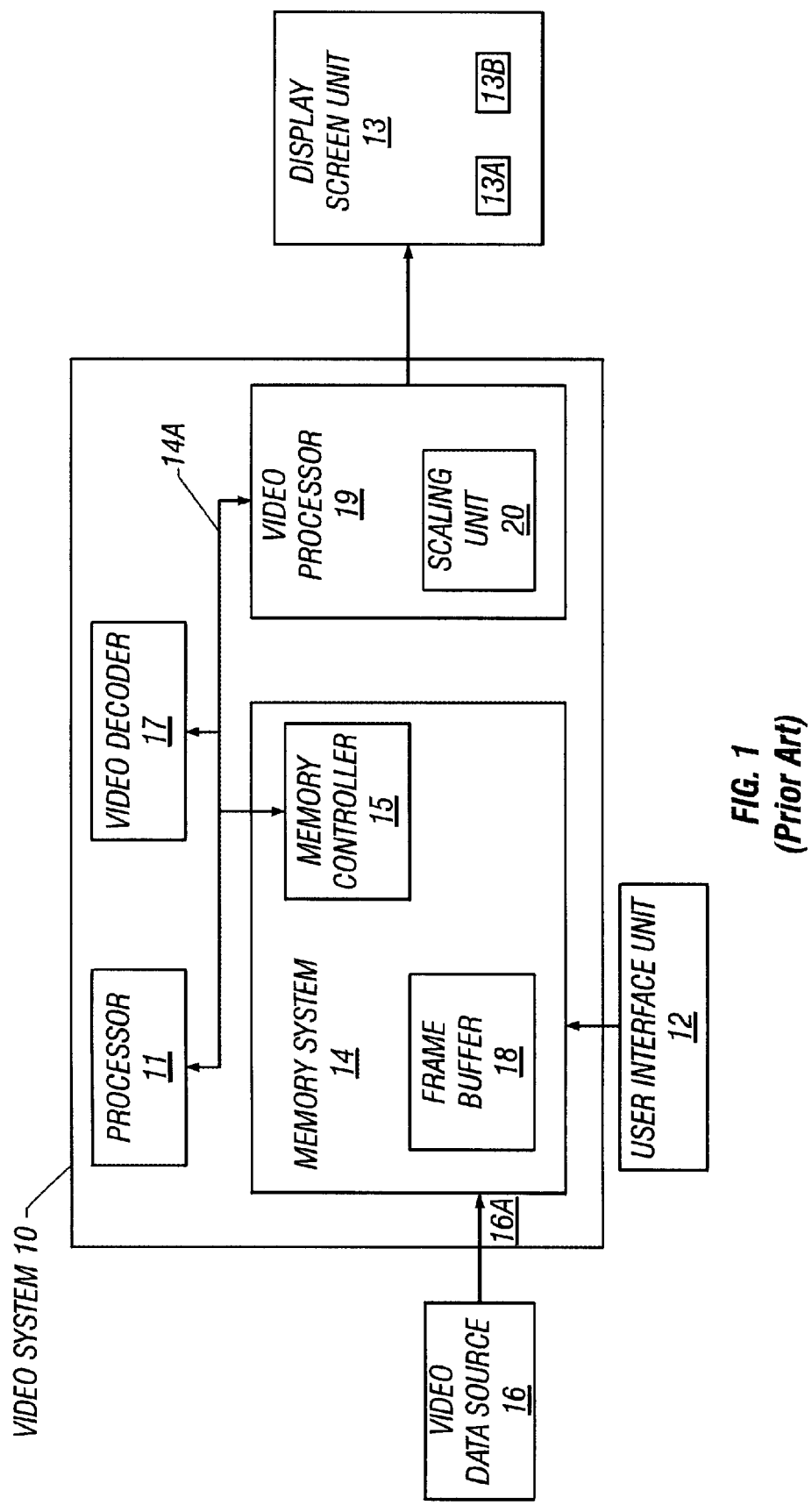
FIG. 1 shows a block diagram of a prior art video system including a display screen and a user interface.

An embodiment of a video system 10 coupled to a user interface unit 12, and a display screen unit 13 is shown in FIG. 1. The user interface unit 12 allows a user to interact with the video system 10 and the display screen unit 13. The display screen unit 13 includes a screen 13A which displays processed video data provided from the video system 10. Video system 10 includes a processor 11 which performs a variety of functions in hardware and software such as computational processing, bus arbitration, data transfer operations, etc. The video system 10 further includes a memory system 14 having a memory controller 15 which coordinates the accessing of the memory system with other blocks within the video system. Video data 16A read from a video data source 16 is decoded by a video decoder 17 and the decoded data is stored in the memory system 14 in a frame buffer area 18. A video processor 19 retrieves the decoded data and provides it to the display screen unit 13 at a rate dependent on the display screen rate. The video processor includes a scaling unit 20 for retrieving the decoded video data from the frame buffer area 18 and scaling it to adapt the format of the original video data 16A to the format of the display screen 13. In essence, the scaling unit either increases or decreases the number of pixels per frame. Commonly the display screen unit 13 includes an encoding unit 13B which encodes the formatted and scaled data received from the video processor and converts it into an analog signal for driving the display screen 13A.

Figure 2:
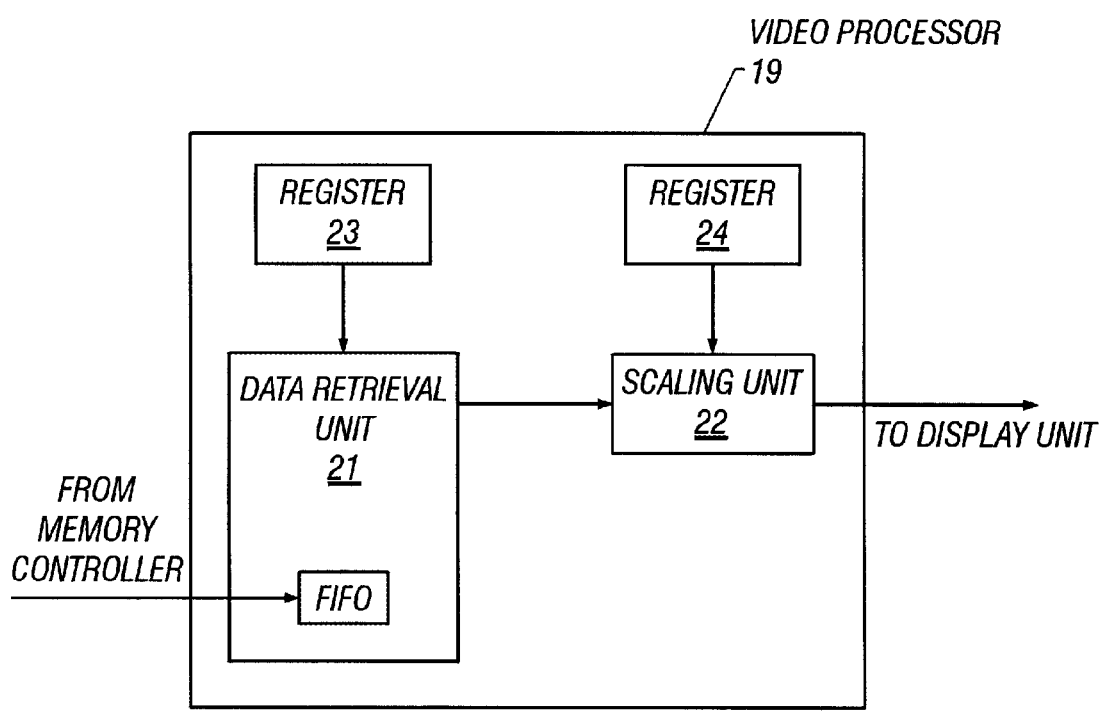
FIG. 2 shows a system for performing "on-the-fly" zooming in accordance with one embodiment of the system and method of the present invention.

FIG. 2 shows an embodiment of a system for providing "on-the-fly" zooming in a display system such as shown in FIG. 1. The system includes a video processor 19 having a data retrieval unit 21, a scaling unit 22, and registers 23 and 24. In response to a base address memory location stored in register 23, the retrieval unit 21 requests video data from the frame buffer area 18 at the address indicated in register 23. The base address memory location corresponds to the starting address within frame buffer area 18 where retrieval unit 21 begins accessing a frame of data.

Figure 3:
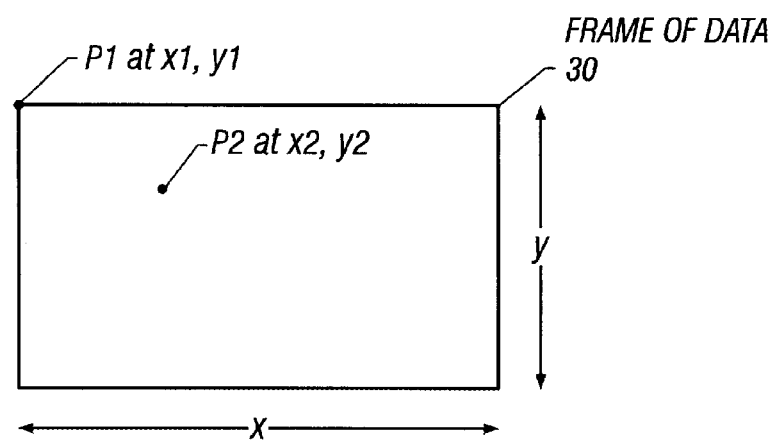
FIG. 3 shows a frame of pixel data and corresponding base addresses.

For instance, FIG. 3 shows a frame of video data having x pixels in the horizontal direction and y pixels in the vertical direction. Each pixel has a corresponding memory address which indicates where in the frame buffer the pixel is stored. In non-zoom operation, when an entire frame of pixel data is retrieved from the frame buffer by the video processor, the retrieval unit 21 requests frame data starting from the first pixel (p1, FIG. 3) in the frame. In this case the memory address stored in register 23 is the memory address $x_1$, $y_1$ corresponding to pixel p1. In zoom "on-the-fly" operation, register 23 stores a memory address location other than the first pixel address location. For example, as shown in FIG. 3, a pixel p2 within the frame buffer marks the beginning of where retrieval unit 21 might request data from the frame buffer area 18. Hence, in this case, register 23 stores an address $x_2$, $y_2$. Moreover, the same $x_2$ off-set is maintained as each line of pixel data is retrieved for a given frame prior to the next vertical blanking period. If no new base address is specified during the next blanking period, the next frame of data is also retrieved beginning at address $x_2$, $y_2$.

Figure 4A:
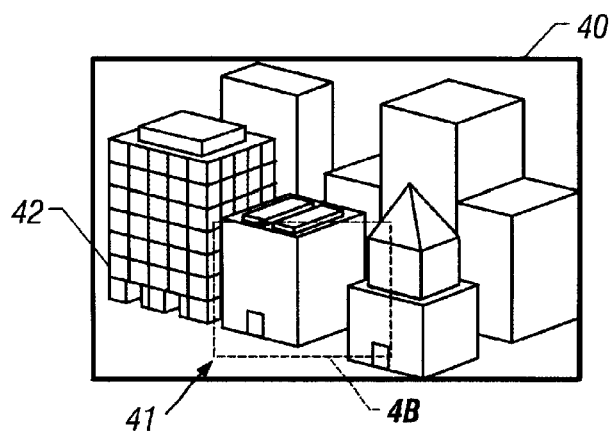
FIGS. 4A and 4B illustrate the method of "on-the-fly" zooming in accordance with one embodiment of the present invention.

Register 23 is updated during the next video blanking period whenever a new base address is provided by the user via the user interface 12. A new base address can be specified by a user in a number of manners depending on the user interface. For instance, in the case in which the display screen unit 13 is part of a computer screen and the user interface unit 12 is a mouse, the user can "point" and "drag" the mouse to define the area for zooming. FIG. 4A illustrates an example of a selected area 41 in a display screen 40 which is selected by the mouse "point and drag" technique. The information received by the interface once the area is selected, is then interpreted to determine the base address (i.e., the starting pixel 42) of the selected area which is then loaded into register 23 during the next video blanking period.

Register 24 stores scaling factor information which is used by scaling unit 22 to perform the scaling operations on the video data retrieved from the frame buffer by the retrieval unit 21. The scaling factor information to be stored in register 24 is determined from the information received through the user interface. In one embodiment, if the user interface is a mouse in a computer system with a display screen, the user selects a window on the screen with the mouse which is smaller than the overall size of the screen as shown in FIG. 4A. The size (i.e., number of pixels in each of the vertical and horizontal dimensions) of the selected window over the size (i.e., number of pixels in each of the vertical and horizontal dimensions) of the display screen is used by the display system to determine scaling factor information to be stored in register 24. The scaling factor information can include a vertical scale factor and a horizontal scale factor. The vertical scale factor is the ratio of the number of vertical pixels of the selected screen to the number of vertical pixels of the display screen. Similarly, the horizontal scale factor is the ratio of the number of horizontal pixels of the selected screen to the number of the horizontal pixels of the display screen.

For example, assume the user selects a rectangle that covers the bottom left quarter of the display screen. The new base address will be the address of the pixel on the left top corner half way down (x=0, y=240 for NTSC format). Since the size of the rectangle fills one quarter of the screen, we need to scale the picture up by four to fill the display screen. To scale by four entails scaling the horizontal by two and the vertical by two to give a total area scale of four (i.e. 2×2). Hence, the amount we need to scale is the ratio of the original number of pixels (original # of pixels) over the new number of pixels (new # of pixels), (original # of pixels/new # of pixels). The scale factor register stores the reciprocal of this ratio, (new # of pixels/original # of pixels). So, if you want to scale up by 2× in the horizontal direction, the horizontal scale factor stored in the horizontal scale factor register is 0.5 (0.8 in hexidecimal). This allows for scaling using fractional values such that a whole number register is not required and only a fractional register is needed.

As with register 23, register 24 is updated during the next video blanking period whenever new scale factor information is provided by the user via the user interface 12. In one embodiment, a computer mouse and the size and location of a selected window determines the scaling factor information. Alternatively, the user can specify scaling information by using a keyboard or handheld control to enter new scale factor related information.

In accordance with one method of the "on-the-fly" zoom video system, when the system is in normal mode operation (i.e., not "on-the-fly" zooming) the data retrieval unit 21 retrieves full frames of video data from the frame buffer area starting at the first pixel p1 and ending at the last pixel of the frame of data. These pixels are processed by the scaling unit 22, using the scale factor information currently stored in register 24. In one case of normal mode operation, the scale factor information is information that is automatically determined by the video system so as to scale the video data received from the source 16 (FIG. 1) to the format of the display screen unit 13 (FIG. 1). Typically, the system automatically determines the scale factor information using known information about the size of the display screen, the format of the display screen, and the format of the video source data.

In another case the system may be operated in a zoom mode which is still not "on-the-fly" zooming. In this mode, the scale factor information is provided by a user through a user interface while the video display screen is stationary. For instance, if a user wanted the video display to be increased (i.e. zoomed) in size by 2× at the beginning of a viewing period or while the picture is paused, the user may select a 2× setting while the video display is stopped. As a result, registers 23 and 24 are updated while the display system is stopped. When the video display resumes, each full frame of pixel data is scaled up by 2×.

Figure 4B:
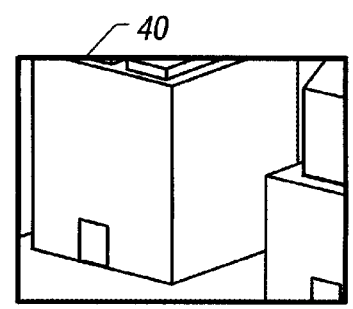

Finally, when the system is in the zoom "on-the-fly" mode scale factor information is provided through a user interface while the video display is in-motion by a user selecting a window within the display screen which defines a new base address and dimensions to the selected window. The new base address is stored into a first temporary register R1 which can reside in the same location as registers 23 and 24. The dimensional information is converted into new scaling factor information and is stored in a second temporary register R2. During, the next video blanking period, the new base address stored in register R1 is moved into register 23 and the new scaling information stored in register R2 is moved into register 24. After the video blanking period, the new base address is used to determine where in the frame buffer area 18 that the retrieval unit should begin retrieving pixel data. As a result, the video data being scaled corresponds to the selected window pixel data in the display screen. In addition, after the video blanking period, the new scaling information loaded into register 24 during the video blanking period is used to perform the scaling of the video data retrieved from the frame buffer. Since updating of registers 23 and 24 happens in a time period between displaying frames of data (i.e., the video blanking period), the method of the present invention ensures that artifacts from previous frames of data are not seen during "on-the-fly" zooming. FIGS. 4A and 4B illustrate an example of a zoom "on-the-fly" operation in which a selected window 41 is zoomed to the full size of the display screen 40.

Figure 5:
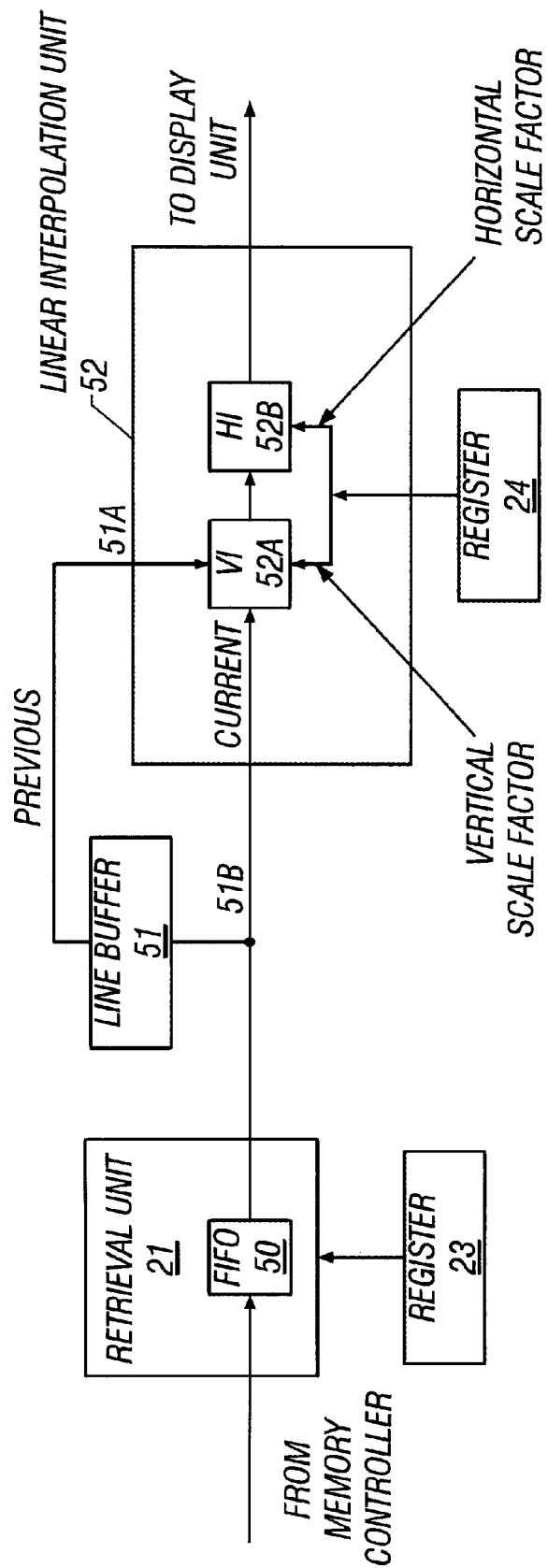
FIG. 5 shows one embodiment of a scaling system implemented to achieve "on-the-fly" zooming in accordance with the present invention.

In accordance with another embodiment of the system and method of "on-the-fly" zooming, scaling unit 22 performs linear interpolation scaling. When performing this type of scaling, a previous pixel value P in a line of pixels from the frame buffer and a current pixel value C in the same line of pixels are used to generate at least one intermediate pixel value which resides between the previous and current pixel values. FIG. 5 shows an embodiment of scaling unit 22 which performs linear interpolation scaling. During each of the video blanking periods, a FIFO 50 residing in retrieval unit 21 retrieves video data starting from the base address stored in register 23. For each line of data stored in the buffer, the FIFO retrieves enough data to fill the current display line. Since the video processor is scaling data, the FIFO may not retrieve as many pixels from the frame buffer as are to be displayed. For example, if a 2× scaling is being performed, each pixel fetched by the FIFO will generate 2 pixels from the scaler. In this case, only half as much data is retrieved for a given scaled line, as compared to an unscaled line.

The FIFO 50 provides data (on a line-by-line basis) to a line buffer 51 and to linear interpolation scaling unit 52. Line buffer 51 stores a previous line of pixel data provided from FIFO 50 so that the linear interpolation scaling unit 52 receives a previous line of pixel data on bus 51A and a current line of pixel data on bus 51B. Linear interpolation scaling unit 52 performs linear interpolation scaling using the scaling factor information stored in register 24. Hence, in the case in which during a last vertical blanking period registers 23 and 24 have been updated with a new base address and new scaling information, respectively, FIFO 50 is loaded with a frame of video data starting at the new base address and the linear interpolation scaling unit 52 begins scaling the data provided from the FIFO. As shown in FIG. 5, the scaling unit includes a vertical interpolation unit 52A and a horizontal interpolation unit 52B. In this embodiment, the scaling factor information includes a vertical scale factor and a horizontal scale factor. The vertical interpolation unit 52A uses the vertical scale factor and the horizontal interpolation unit 52B uses the horizontal scale factor to perform scaling on the data received from the vertical interpolation unit 52A.

In accordance with another embodiment of the zoom "on-the-fly" display system and method, scaling is performed using fixed point computational operations instead of integer operation. Traditionally, display system scaling operations have been performed using integer operations so as to reduce the complexity of the scaling hardware and software and also since only integer scaling operations were desired (i.e., 2×, 4× zooming). In contrast, in accordance with one embodiment of the system and method of "on-the-fly" zooming, by using fixed point computation instead of integer computations, fractional zoom factors are possible. Consequently, the zoom factor can be changed to any fractional value depending on the size of the window 41 (FIG. 4) selected by the user interface, thereby providing an infinite range of scaling.

FIG. 6 shows a logical block diagram of one embodiment of the vertical interpolation unit 52A corresponding to an ⅛ step linear interpolator. In other words, between two original pixels (e.g., a previous and a current pixel) additional interpolated pixels can be generated at ⅛ intervals. In this case, size is equal to 8 (i.e., size=8) which is equal to the number of possible pixel increments between a current and previous pixel. The vertical interpolation unit 52A includes a first logical operation unit 60 coupled to the previous digital pixel value and a second logical operation unit 61 coupled to the current digital pixel value. The first logical operation unit 60 logically multiplies the previous digital pixel value with a digital multiplication factor value m. If the vertical scale amount is 2×, then the vertical scale factor is 1/scale amount=½ and m is initially equal to the product of the scale factor and the size (i.e., $m_{initial}$=scale factor×size). The second logical operation unit 61 logically multiplies the current digital pixel value with a digital value equal to (size-m). The digital resultant of these two logical multiplications are digitally added with logical adder 62 and then divided by a digital value equivalent to the size by logical divider 63. The result of these logical operations is a new digital pixel value residing between the previous and current pixel values. The initial digital multiplication factor value $m_{initial}$ is determined by processor 11 from the scaling factor information. To generate more pixel values between current and previous values (depending on the vertical scale factor) the digital multiplication factor m is incremented by $m_{initial}$ (i.e., $m_{current}$=$m_{initial}$+$m_{previous}$) to generate $m_{current}$ and the logical operations are performed again using the new $m_{current}$ to generate another interpolated pixel value between the previous and current pixel values.

Table 1 shows an example of a succession of multiplication factor values m and the corresponding function performed by the vertical interpolation unit 52A for a previous pixel value P and a current pixel value C, where the scale factor is equal to 0.25 (corresponding to a scale amount of 4×), size=8, and $m_{initial}$=2.

TABLE 1

| Pixel | m | interpolation function |
|---|---|---|
| P | 0 | (P*8 + C*0)/8 |
| P1 (interpolated value) | 2 | (P*6 + C*2)/8 |
| P2 (interpolated value) | 4 | (P*4 + C*4)/8 |
| P3 (interpolated value) | 6 | (P*2 + C*6)/8 |
| C | 8 | (P*0 + C*8)/8 |

As shown, the first pixel value which corresponds to the previous pixel value P is generated with m=0 such that the function performed by the vertical interpolation unit 52A is (P*8+C*0)/8=previous pixel value P. The next interpolated pixel is generated by using the initial value $m_{initial}$=scale factor x size=0.25×8=2 and using the same previous pixel P and current pixel C values to generate interpolated pixel P1=(P*6+C*2)/8. The next interpolated pixel is determined by incrementing m by $m_{initial}$ to generate interpolated pixel P2=(P*4+C*4)/8. The next interpolated pixel P3 is determined similarly. When m is incremented such that it equals the size value then the current pixel becomes the previous pixel and a new next pixel in the line is used for the current pixel value P and a new set of interpolated pixels are determined.

It should also be noted that infinite value scaling is made possible by using fixed point computational operations to perform interpolation and scaling using non-integer scaling and multiplication factors.

The pixel values determined by the vertical interpolation unit 52A are provided to the horizontal interpolation unit 52B and horizontal interpolation is performed in the same manner as vertical interpolation where a previous pixel value P, a current pixel value C, the multiplication factor m, and the scale factor are used to determine interpolated pixel values between the previous and current pixel values.

In one application of "on-the-fly" zooming, director's cut information is extracted from letterbox formatted video data to allow user's to either 1) use the director's cut information to create their own "panned and scanned" version from letterbox formatted data to view on a differently formatted display screen (e.g., T.V.) or 2) disable director's cut information to allow the user to move the central viewing point to anywhere in the frame of data when viewed on a differently formatted display screen. FIG. 7A shows a frame of letterbox formatted pixels 70 having $x_1$ horizontal pixels and $y_1$ vertical pixels being displayed on a differently formatted display screen 71, such as a T.V. screen. As shown, since the aspect ratio of the number of horizontal pixels to the vertical pixels of the letterbox format is different than the display screen 71 format, the viewer sees black boxes 72 at the top and bottom of the movie.

Currently, DVD discs are available which have the letterbox formatted version of a movie on one side of the disc and have a "panned and scanned" version of the same movie on the other side of the disc. The "panned and scanned" version (FIG. 7B) of the movie has already been reformatted to the T.V. format by scaling the letterbox frame data so that the number of vertical pixels $x_2$ fills the T.V. screen and black boxes 72 are no longer visible. However, since the horizontal pixels $y_2$ are also increased during the scaling process, the sides 74 of each frame of pixel data that do not fit in the T.V. screen area 71 are "cut-off". In addition, during the reformatting process, director's cut information is used to determine where the center of focus of the original frame of letterbox data is to be and hence whether more should be "cut-off" from one or the another side of the scaled letterbox data to fit within the T.V. display area. For instance, FIGS.

Figure 7C:
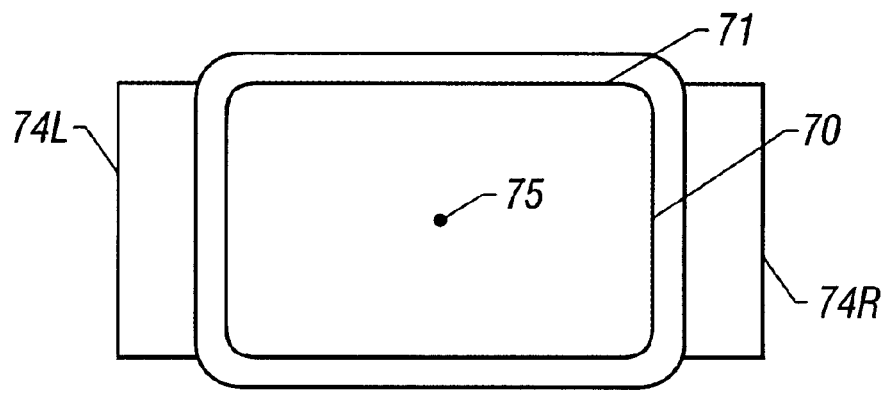
FIGS. 7C–7E show the "panned and scanned" version of a frame of letterbox formatted $_1$pixel data each having different centers of focus within the original letterbox formatted frame.
Figure 7D:
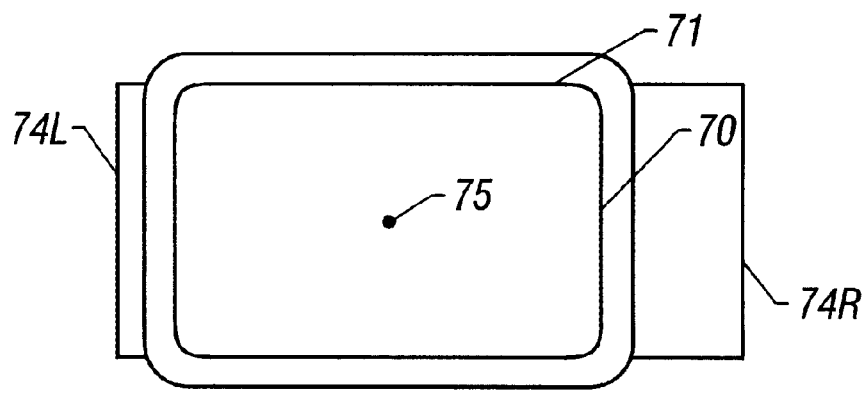
Figure 7E:
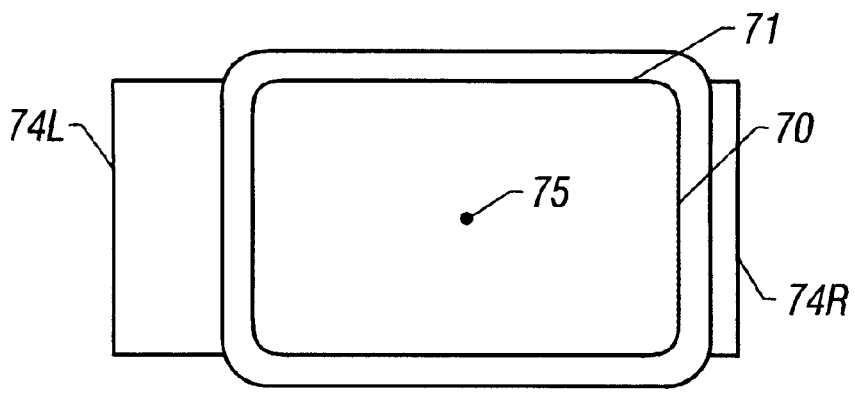

7C, 7D, and 7E show three cases in which the center of focus 75 is in different locations within the letterbox formatted frame of data including the middle of the original letterbox version (7C), to the left (7D), or to the right (7E). As can be seen in FIGS. 7C, 7D, and 7E each have different amounts of pixel data "cut-off" from each of the left side (74L) and right side (74R) of the letterbox frame of pixel data. Consequently, due to the current practice of having a letterbox version of a movie on one side of a disc and the "panned and scanned" version on the other, more storage space is used to provide a user with the desired formatted data to view a given movie.

In contrast to this current practice, the present invention avoids having to provide a previously "panned and scanned" version and also provides increased viewing flexibility to the user. Hence, in accordance with another embodiment of the present invention using "on-the-fly" zooming, a letterbox version of A/V data is provided to a video system such as shown in FIG. 1. Currently, director's cut information is also encoded within the letterbox formatted data. This director's cut data is extracted from the video data by the processor 11 and is interpreted to determine the base address for each frame which ensures that the display is centered according to the director's cut information after it has been appropriately scaled by the scaling unit. Register 23 is then updated with the determined base address for each frame in the manner as described above for performing "on-the-fly" zooming. It should be noted that the scaling factors are set to scale the letterbox formatted data to the display screen format. In this embodiment, the scale factors remain the same since the letterbox formatted data is consistently being reformatted to the particular display screen format. As a result, register 24 is not being updated unless the user decides to zoom in on a particular area within the screen. However, register 23 is updated each time the director's cut information indicates that the center of focus is moved thereby causing the base address to change. Hence, in this embodiment, the scaling factor remains constant and the base address changes as the director's cut information changes. Moreover, in accordance with this embodiment, it is no longer necessary to provide both the letterbox version and the "panned and scanned" version since the system of the present invention can generate the "panned and scanned" version "on-the-fly". This results in a significant savings in storage space to DVD disc manufacturers.

Alternatively, according to this same embodiment, the user may choose to disable the director's cut information and change the center of viewing focus to random areas within the letterbox formatted frame data. In this case, the user indicates with the user interface a point on the screen indicating the area of interest. This may be accomplished using keyboard arrow keys, a mouse, or handheld control. Once, the user disables the director's cut information and indicates a point of interest on the screen, register 23 is updated with a new base address corresponding to the selected point on the screen and the frame of displayed data will shift to show the selected area. This provides the user the ability to determine where the center of viewing focus will be instead of this being determined by the director's cut information thereby giving the user considerable viewing flexibility.

In the preceding description, numerous specific details are set forth, such as specific zoom and scale factors in order to provide a thorough understanding of the present invention. It will be apparent, however, to one skilled in the art that these specific details need not be employed to practice the present invention. In other instances, well known structures and components have not been described in order to avoid unnecessarily obscuring the present invention.

Moreover, although the components of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments are not intended to limit the scope of the claims which themselves recite only those features regarded as essential to the invention.

What is claimed is:

1. A display system for displaying video data in a video system including a display screen, a user interface for allowing a user to interact with said display screen, and a first memory storage area for storing said video data, said display screen having an associated video blanking period, said display system comprising:

second memory storage area for storing current scaling factor information obtained from said user interface while said display screen is in-motion;

third memory storage area for storing current base address information corresponding to a retrieval starting point within a frame of video data stored in said first memory storage area obtained from said user interface while said display screen is in-motion;

means for updating during said video blanking period said second memory storage area with said current scaling factor information and said third memory storage area with said current base address information;

means for retrieving a frame of video data from said first memory storage area using said current base address information after said video blanking period;

means for scaling said retrieved frame of video data using said current scaling factor information;

means for outputting scaled video data from said scaling means to said display screen wherein video data scaling and scanning occurs while said display screen is in-motion.

2. The system as described in claim 1 wherein said current scaling factor information and said current base address information are determined when said user interface selects a window of data in said display screen.

3. The system as described in claim 2 wherein said user interface is a mouse.

4. The system as described in claim 2 wherein said user interface is a keyboard.

5. The system as described in claim 1 wherein said current scaling factor information and said current base address information are directly provided through said user interface.

6. The system as described in claim 5 wherein said user interface is a keyboard.

7. The system as described in claim 1 wherein said current scaling factor information includes vertical and horizontal scale factors.

8. The system as described in claim 1 wherein said current base address information includes a vertical address and a horizontal address of a pixel of data in a given frame of data stored in said memory area.

9. The system as described in claim 1 wherein said scaling means comprises interpolation hardware which performs computational operations using said current scaling factor information in a fixed point integer format.

10. A video system comprising:

a display screen having an associated video blanking period;

a user interface for allowing a user to interact with said display screen and video system;

a first memory storage area for storing frames of video data;

a second memory storage area for storing current scaling factor information obtained from said user interface while said display screen is in-motion;

a third memory storage area for storing current base address information corresponding to a retrieval starting point within a frame of video data stored in said memory storage area obtained from said user interface while said display screen is in-motion;

means for updating during said video blanking period said second memory storage area with said current scaling factor information and said third memory storage area with said current base address information;

means for retrieving a frame of video data from said first memory storage area using said current base address information after said video blanking period;

means for scaling said retrieved frame of video data using said current scaling factor information;

means for outputting scaled video data from said scaling means to said display screen wherein video data scaling and scanning occurs while said display screen is in-motion.

11. The system as described in claim 10 wherein said current scaling factor information and said current base address information are determined when said user interface selects a window of data in said display screen.

12. The system as described in claim 11 wherein said user interface is a mouse.

13. The system as described in claim 11 wherein said user interface is a keyboard.

14. The system as described in claim 10 wherein said current scaling factor information and said current base address information are directly provided through said user interface.

15. The system as described in claim 14 wherein said user interface is a keyboard.

16. The system as described in claim 10 wherein said current scaling factor information includes vertical and horizontal scale factors.

17. The system as described in claim 10 wherein said current base address information includes a vertical address and a horizontal address of a pixel of data in a given frame of data stored in said memory area.

18. The system as described in claim 10 wherein said scaling means comprises interpolation hardware which performs computational operations using said current scaling factor information in a fixed point integer format.

19. A method of displaying video data in a video system including a user interface and a first memory storage area for storing frames of video data, said method comprising the steps of:

obtaining current scaling factor information and current base address information while said display screen is in-motion;

updating a second memory storage area with said current scaling factor information and current base address information during a video blanking period occurring after obtaining said current scaling factor information and current base address information;

retrieving a next frame of video data occurring after said video blanking period from said first memory storage area using said current base address information; and scaling said retrieved next frame of video data using said current scaling factor information, and outputting a scaled next frame of video data to said display screen after said video blanking period.

20. The method as described in claim 19 further comprising the step of obtaining said current scaling factor information and current base address information through said user interface.

21. The method as described in claim 19 further comprising the step of obtaining current scaling factor information and current base address information from director's cut information.

22. The method as described in claim 19 further comprising the step of disabling director's cut information received from a video source and using said current base address information provided through said user interface to center said frames of video data on said display screen wherein said current scaling information prior to said video blanking period and after said video blanking period is the same.

23. The method as described in claim 19 further comprising the step of using director's cut information obtained from a video data source to obtain said current base address information so as to center said frames of video data on said display screen wherein said current scaling information prior to said video blanking period and after said video blanking period is the same.

24. The method as described in claim 19 further comprising the steps of:

providing a letterbox version of video data from a data source including director's cut information to said video system;

extracting from said director's cut information said current base address information and said current scaling information;

whereby a panned and scanned version of said video data is concurrently generated and displayed by said video system.

* * * * *